United States Patent [19]
King et al.

[11] Patent Number: 5,617,776
[45] Date of Patent: Apr. 8, 1997

[54] INDUCED DRAFT GAS FIRED FRYER

[75] Inventors: James D. King, Dayton; Stephen Werts, Eaton, both of Ohio

[73] Assignee: Henny Penny Corporation, Eaton, Ohio

[21] Appl. No.: 395,862

[22] Filed: Feb. 28, 1995

Related U.S. Application Data

[63] Continuation-in-part of Ser. No. 101,059, Aug. 3, 1993, Pat. No. 5,402,713.

[51] Int. Cl.⁶ .............................. A47J 27/00; A47J 37/12; F24D 1/00
[52] U.S. Cl. ................. 99/408; 99/330; 99/403; 126/391; 126/360 R
[58] Field of Search .............................. 99/403, 407, 408, 99/330, 336; 126/390, 391, 374–376, 378, 360 R; 122/44.1, 49, 135.1, 136 R; 219/421, 437, 438; 431/1

[56] References Cited

U.S. PATENT DOCUMENTS

| | | |
|---|---|---|
| 886,268 | 4/1908 | Stuart . |
| 1,182,863 | 5/1916 | Toussaint . |
| 1,434,313 | 10/1922 | Prat . |
| 1,630,309 | 5/1927 | Pitman . |
| 2,124,186 | 12/1936 | Childs . |
| 2,147,335 | 2/1939 | De Fazi . |
| 2,292,156 | 7/1939 | Pitman . |
| 2,400,653 | 5/1946 | O'Dowd . |
| 2,429,360 | 10/1947 | Kells . |
| 2,543,835 | 3/1951 | Dewey . |
| 2,617,407 | 11/1952 | Johnson . |
| 3,060,922 | 11/1959 | Wilson . |
| 3,313,288 | 12/1964 | Aho . |
| 3,376,806 | 1/1967 | Magnusson . |
| 3,640,208 | 2/1972 | Size . |
| 3,970,072 | 7/1976 | Chipchase . |
| 4,026,804 | 5/1977 | Keating . |
| 4,289,111 | 9/1981 | Duncan et al. . |
| 4,466,479 | 8/1984 | MacLean . |
| 4,481,873 | 11/1984 | Keating ........................ 99/403 |
| 4,660,542 | 4/1987 | Scherer . |
| 4,690,127 | 9/1987 | Sank . |
| 4,751,915 | 6/1988 | Price . |
| 4,848,318 | 7/1989 | Brewer . |
| 4,858,592 | 8/1989 | Hayek et al. . |
| 4,913,042 | 4/1990 | Miller . |
| 4,928,664 | 5/1990 | Nishino et al. . |
| 4,993,402 | 2/1991 | Ripka . |
| 5,033,368 | 7/1991 | Brewer ........................ 99/330 |
| 5,038,753 | 8/1991 | Yokoyama et al. . |
| 5,050,582 | 9/1991 | Almond et al. . |
| 5,094,224 | 3/1992 | Diesch . |
| 5,101,806 | 4/1992 | Hunt et al. ...................... 126/391 |
| 5,154,161 | 10/1992 | Rodgers et al. . |
| 5,253,567 | 10/1993 | Gunawardena . |
| 5,261,322 | 11/1993 | Yokoyama et al. . |
| 5,398,668 | 3/1995 | Daneshvar et al. . |
| 5,402,713 | 4/1995 | King . |
| 5,417,202 | 5/1995 | Cote . |

FOREIGN PATENT DOCUMENTS

| | | |
|---|---|---|
| 2514474 | 4/1983 | France . |
| 707401 | 5/1966 | Italy . |

*Primary Examiner*—Timothy F. Simone
*Attorney, Agent, or Firm*—Baker & Botts, L.L.P.

[57] ABSTRACT

A deep fat fryer is disclosed that employs an interior array of heat exchanger tubes arranged in a "U" configuration along the sides and back of the vat. The heat exchanger tubes are located in the interior of the vat with the ends attached to the front vat wall. Combusting fuel and oxygen are directed through the heat exchanger tubes using either a premix burner located at one end of each tube or by using an atmospheric burner generally adjacent to one end of each tube and inducing a draft through each tube. The combustion gases produced by the burners travel through the heat exchanger tubes and exit into a combustion channel. The combustion channel directs the gases exiting the heat exchanger tube around and in contact with at least a portion of the exterior wall of the vat and then to an exhaust flue at the rear of the vat.

15 Claims, 8 Drawing Sheets

INDUCED DRAFT GAS FIRED FRYER

This application is a Continuation-in-Part of U.S. patent application Ser. No. 08/101,059 filed Aug. 3, 1993 now U.S. Pat. No. 5,402,713.

BACKGROUND OF THE INVENTION

1. Field of the Invention

This invention relates generally to cooking devices, and more specifically, to large heating area deep fat fryer vats in which the cooking medium is heated by multiple circulating flows of heated gas from burner nozzles.

2. Description of the Prior Art

Recently, commercial users of deep fat fryer vats have become increasingly aware of the costs associated with operating and maintaining their cooking equipment. Unfortunately, conventional devices have significant disadvantages in the areas of thermal efficiency and maintenance.

Deep fat fryer vats currently in use are heated, among other known methods, by circulating heated combustion products from radiant burners through passages that are in thermal contact with the exterior surface of the vat. An example of such an exterior heating system is taught in U.S. Pat. No. 5,033,368, issued Jul. 23, 1991. The heat that builds up in the vat structure is then thermally transferred to the cooking medium. After the hot combustion products have contributed some of their heat to the system, they are removed to the atmosphere through some type of exhaust flue. This indirect approach to heating the actual cooking media results in various problems.

The thermal efficiency of the conventional indirect cooking method is less than ideal because the surface area through which heat is transferred is significantly less than the surface area surrounding the flow of the flue gases. Therefore, some of the heat will be dissipated without raising the temperature of the cooking medium.

Further, the heat that does raise the temperature of the cooking medium is not evenly applied to the exterior of the vat causing local "hot" or "cold" spots. Conventional devices have a single flow path for the heated combustion products. The temperature of the products decreases as they travel through the passage. Therefore, some regions of the vat will have a significantly higher temperature than other regions making it difficult to achieve a precise and uniform control of the cooking medium temperature. This problem with "hot" and "cold" spots is compounded when the medium is stationary i.e., it does not circulate through the vat.

A second barrier to controlling the cooking medium temperature that is encountered with conventional devices is the indirect heat transfer process. In order to heat the cooking medium, the vat structure must be at a higher temperature than the medium. Once the desired cooking medium temperature is reached, this remaining temperature differential can cause temperature "overshoot". If this occurs, the temperature of the medium can dangerously exceed the safe operating temperature.

Another problem resulting from the conventional technique is scorching of the cooking medium and any food debris that falls off (crumbs, etc.). Exterior vat heating can result in extremely high temperatures on the vat wall and slope areas, such that any resulting sticking and burning can damage the exterior vat walls. These high and nonuniform temperatures may also cause excessive thermal stresses in the vat walls and any welds therein. Any subsequent structural fatigue of the vat wall makes replacement necessary more often.

Finally, the conventional technique of welding the vat and heating apparatus together makes maintenance more expensive. The entire vat assembly must be replaced to repair or replace just a part, causing conventional devices to have high maintenance costs.

Interior passages for heated combustion products have been used in fryer vats. An example of such an interior heating system is taught in U.S. Pat. No. 4,751,915, issued Jan. 21, 1988. A passage through the lower extent of the vat carries heated combustion products from the front wall to the rear wall of the vessel. These straight heat exchanger tubes operate in a low pressure system with burner pressures of 0.25" water column to 0.50" water column.

Unfortunately, uniform temperature control is not achieved with these systems. The cooking oil in the lower region of the vat has a higher temperature because it is closer to the straight heat exchanger tubes. Previous interior heating systems also have only a single direction of flow for combustion products. Since combustion products cool as they transfer heat to the cooking medium, the straight heat exchanger tubes will transfer more heat to the front portion of the vat than to the rear portion. These factors combine to produce erratic and non-uniform temperature distributions.

Fryer vats are commonly equipped with lower unheated regions or cold zones in an attempt to collect food debris without scorching the vat surface. Straight heat exchanger tubes disrupt this process because they are located between the food and the cold zone. Debris settling towards the cold zone can burn or scorch on the outside surfaces of the heat exchanger tubes. This scorching damage results in greater maintenance costs.

These problems have not been overcome in the prior art. The prior art does not teach the capability of maintaining uniform cooking medium temperature, transferring heat efficiently, or preventing scorching damage to the surfaces of the fryer vat. Other drawbacks exist.

SUMMARY OF THE INVENTION

It is therefore an object of the present invention to overcome these and other drawbacks of prior systems.

It is another object of the invention to provide a deep fat fryer capable of maintaining a uniform cooking medium temperature.

It is also an object of the present invention to transfer heat to the cooking medium efficiently.

It is further an object of the present invention to transfer heat without causing scorching damage to the surfaces of the fryer vat.

In a preferred embodiment of the present invention, a deep fat fryer that employs an interior array of heat exchanger tubes arranged in a "U" configuration along the sides and back of the vat is provided. The heat exchanger tubes are located in the interior of the vat with the ends attached to the front vat walls by means of a mechanical fastening on the exterior side of the vat and a seal on the interior side of the vat. Each heat exchanger tube employs one or more premix burner components which fire directly into the heat exchanger tube from one end. Each heat exchanger tube may have its burners on either end of the tube. The combustion gases produced by the burners travel through the heat exchanger tube and exit into a combustion channel. The combustion channel directs the gases exiting the heat exchanger tube around and in contact with at least a portion of the exterior wall of the vat and then to an exhaust flue at the rear of the vat.

A second preferred embodiment provides a deep fat fryer with an array of heat exchanger tubes disposed in the interior of a cooking vat. A flow of combustion products is established through the heat exchanger tubes by inducing a draft through the tubes. The heat exchanger tubes are disposed in the interior of the vat and are attached to the walls of the vat so that the tube ends cover apertures in the vat walls. Atmospheric burners are then disposed outside of the vat walls in proximity to the apertures in the vat walls. A blower is used to induce a draft through the heat exchanger tubes and thereby provide a self-regulating flow of secondary air to the burners and a consequent self-regulating flow of combustion products through the heat exchanger tubes.

The present invention may be used in open vat frying or deep fat pressure frying, during which a sealed lid or closure is latched and locked in the closed position over that vat opening during the cooking process. The present invention is directed to employing novel technology to heat the cooking or frying medium, for the purpose of cooking or frying a variety of food stuffs.

Accordingly, these and other features and advantages of the present invention will become apparent from the following detailed description, wherein reference is made to the Figures in the accompanying drawings.

DETAILED DESCRIPTION

Figure 1:
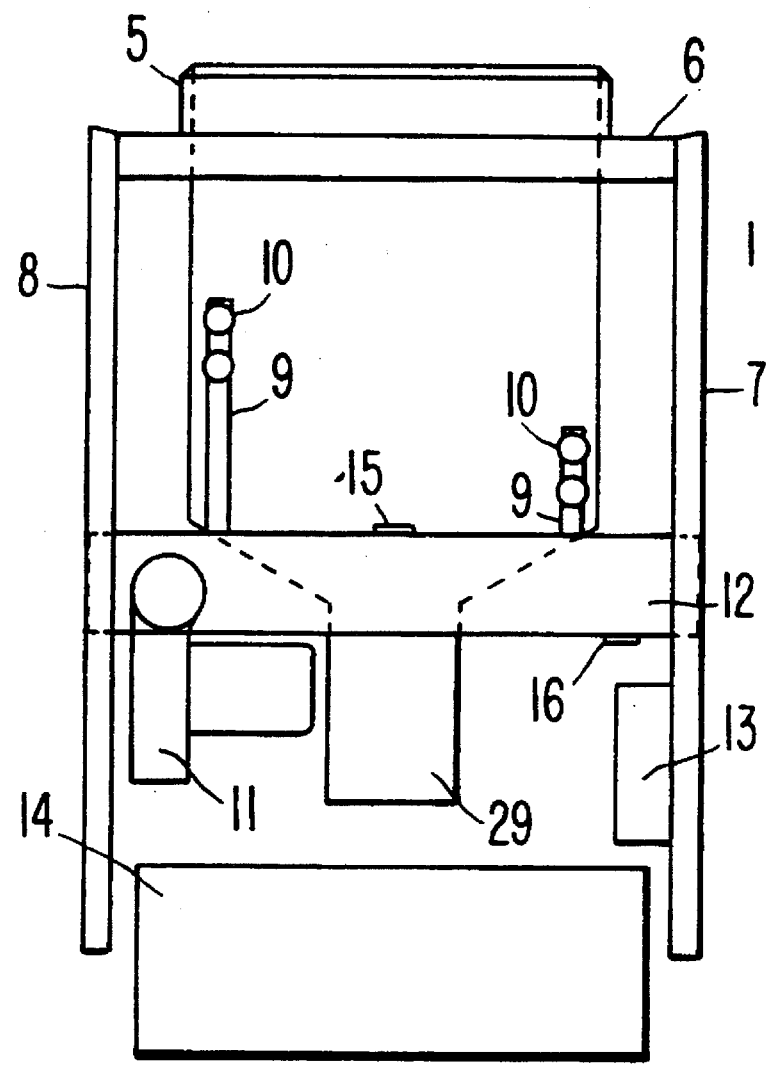
FIG. 1 is a front view of a deep fat fryer of the present invention with the front panel removed.
Figure 2:
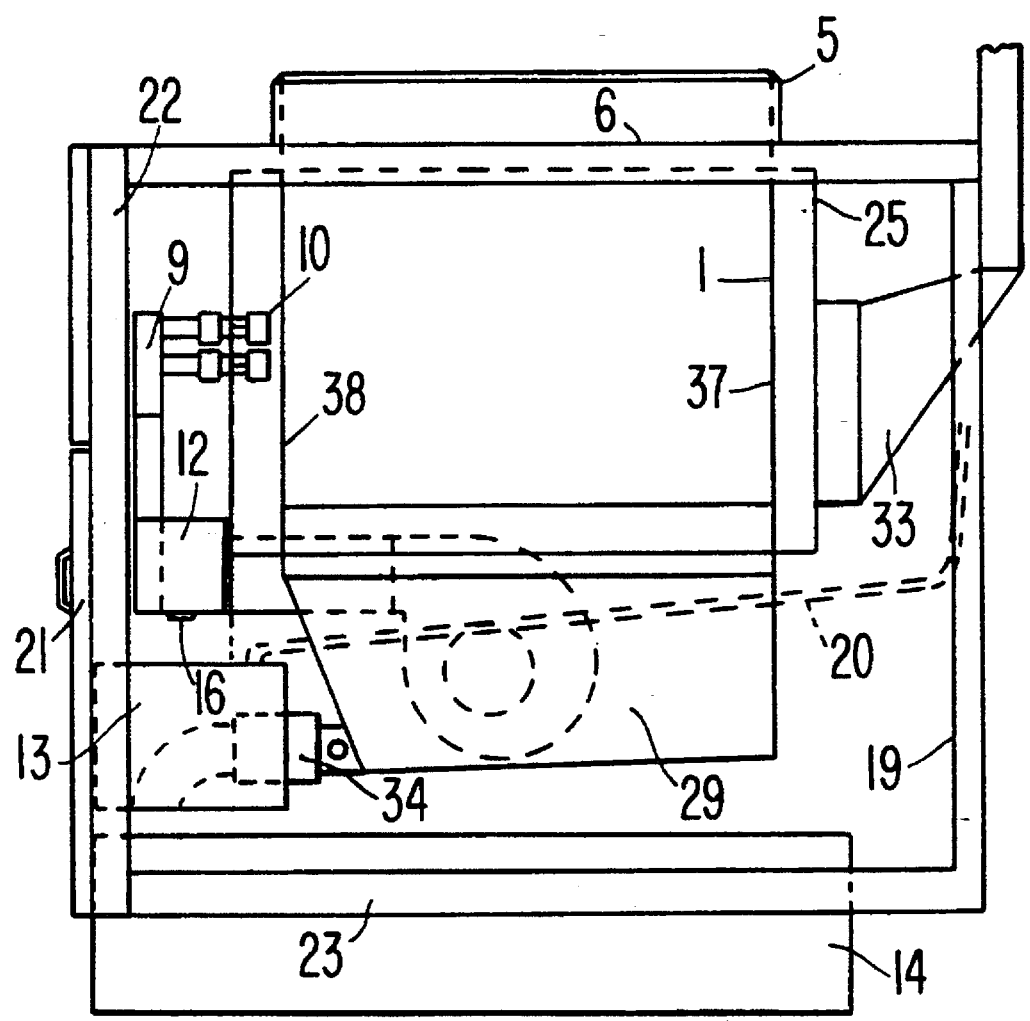
FIG. 2 is a side view of a deep fat fryer with the side panel removed.

Referring now to FIGS. 1 and 2, there may be seen front and side views of a deep fat fryer apparatus of the present invention that includes a vat 1 which contains the liquid or cooking medium to be heated. The vat 1 fits through a top panel 6 and has a lid 5 which can be closed for pressure cooking. The lid 5 is suitably mounted for being opened and closed and locked as is well known in the art. The side walls 36 of the vat 1 are vertical in the upper region but near the lower end the side walls slope inwardly before becoming vertical again to define a thinner lower region or cold zone 29. The rear wall 37 of the vat 1 is vertical throughout its entirety. The front wall 38 of the vat 1 is vertical except in the cold zone 29 where it slopes slightly inward. The vat 1 is supported by a framework made of structural box beams or members on which are mounted a top panel 6, two side walls 7 and 8, a front panel 22, and a rear wall 19. A door 21 in the front panel 22 allows access to the interior of the framework.

Figure 3:
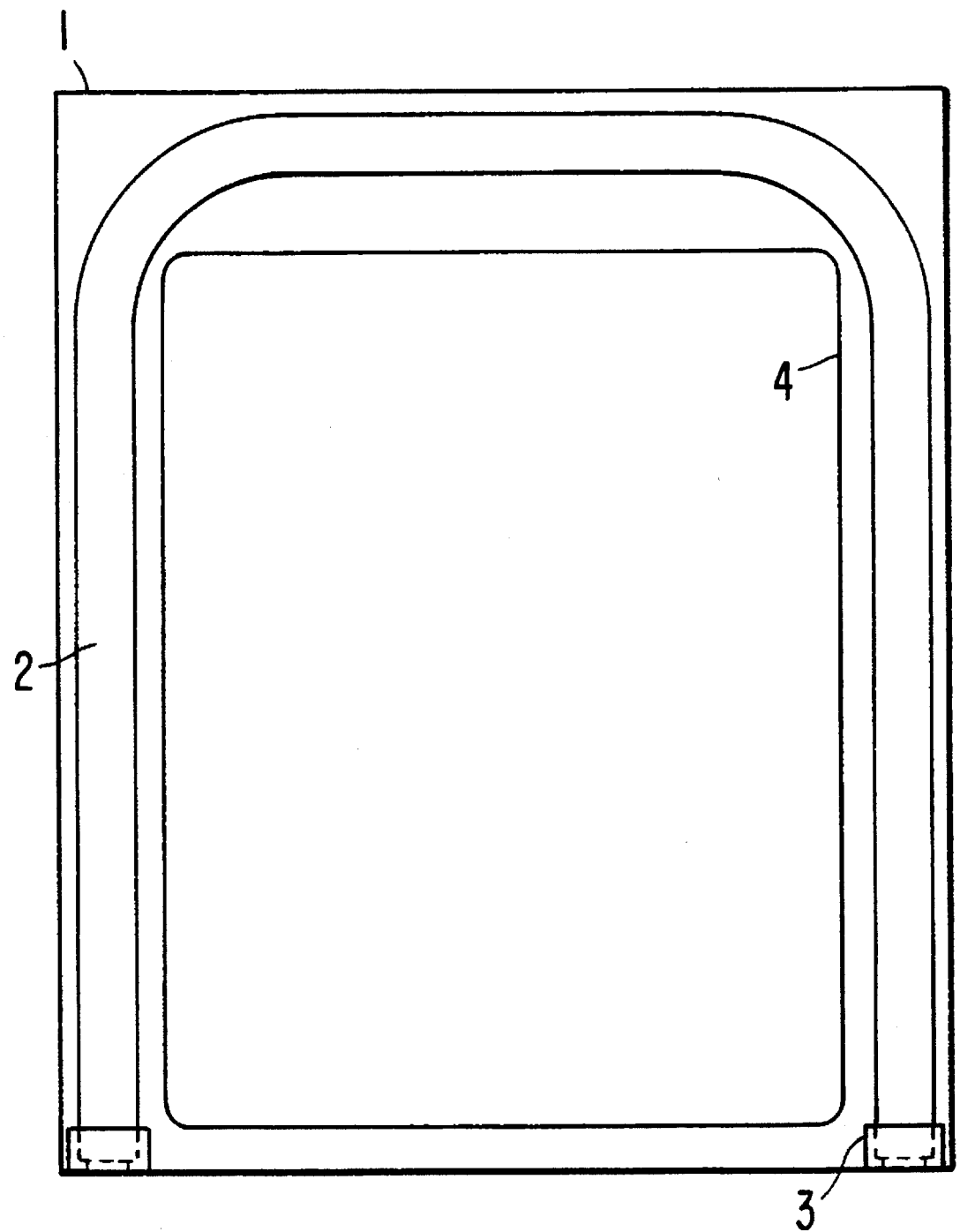
FIG. 3 is a top view of the interior of a vat.

The interior of the vat 1, as depicted in FIG. 3, contains a plurality of "U"-shaped heat exchanger tubes 2, bulkhead fittings 3 and a rack 4 for holding food to be cooked. The tubes 2 are preferably made of 16 gauge type 304 stainless steel tubing (but may be made of other similar materials familiar to those of skill in the art) and have the cross-sectional shape of elongated ovals but with flat sides. A preferred embodiment employs two heat exchanger tubes of the specified cross-section. It has been found, however, that tubing of larger cross-section is hard to find at a commercially reasonable price. Therefore, it may be desirable in some circumstances to use four tubes of smaller cross-section. Nevertheless, the number of such tubes or the cross-sectional shape could be modified without departing from the concepts of the present invention.

The heat exchanger tubes 2 extend around the interior of the vat 1 in a "U"-shape along the sides and rear of the vat 1. A distance is maintained between the outside of the heat exchanger tubes 2 and the inside surface of the vat 1. In the preferred embodiment this distance is at least ⅜ of an inch. This gap allows the outside of the tubes to be cleaned and prevents the cooking medium from being scorched. The position of the heat exchanger tubes 2 in the vat 1 does not impede the settling of food debris into the cold zone 29.

Figure 4:
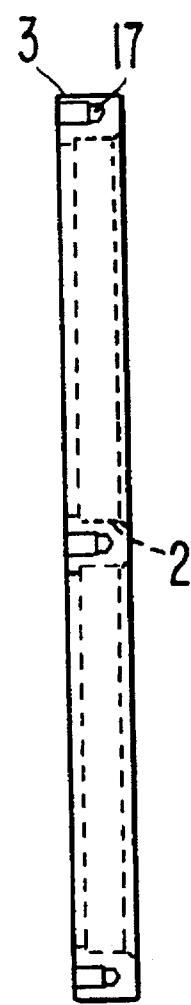
FIG. 4 is a side view of the bulkhead fitting.
Figure 5:
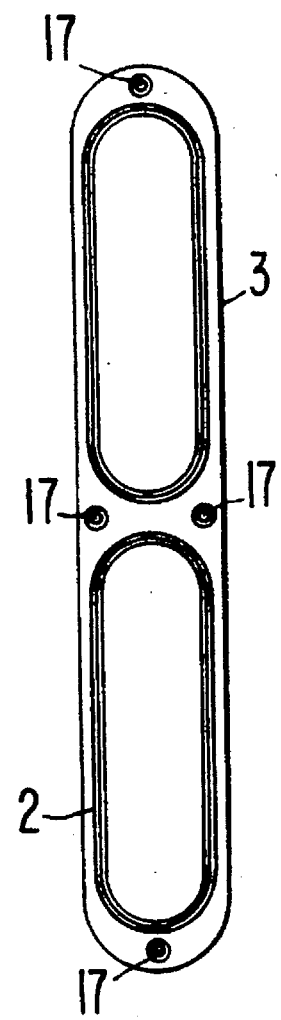
FIG. 5 is a longitudinal cross-sectional view of the bulkhead fitting of FIG. 4.

FIGS. 4 and 5 illustrate how the heat exchanger tubes 2 maintain their position. Each bulkhead fitting 3 is welded to the ends of two heat exchanger tubes 2. Both bulkhead fittings 3 are in turn fastened to the vat 1 by appropriate fasteners 17. In this way, repair or replacement of the heat exchanger tubes can take place without removing the entire assembly.

Referring back to FIGS. 1 and 3, two heat exchanger tubes 2 are preferably employed and each is provided with an ignited gaseous mixture by a plurality of burner nozzles 10, as is well known in the art. The burner nozzles are positioned to directly fire into the heat exchanger tubes 2. In the preferred embodiment each tube has its nozzles 10 placed at different ends. The location of the nozzles 10 in the preferred embodiment indicates that the heated combustion products in the upper heat exchanger tube 2 will be traveling in a direction opposite those in the lower heat exchanger tube 2. The alternating flow of heated combustion products achieves more precise and uniform control of the cooking medium temperature.

Figure 7:
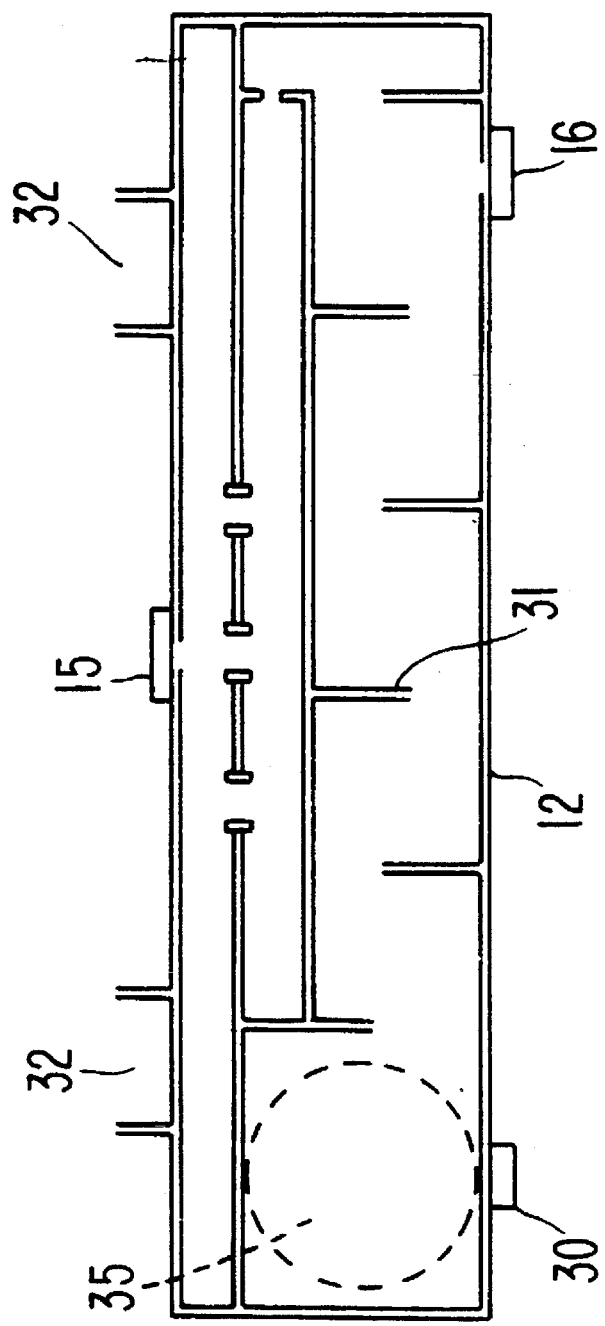
FIG. 7 is a front view in cross-section of the mixing chamber.

The burner nozzles 10 receive a high pressure fuel-air mixture from a mixing chamber 12 by way of conduits 9. The mixing chamber 12, illustrated in FIG. 7, has two pressure taps 15 and 16 and is supplied with air through an air intake opening 35 at the rear of the chamber 12 from a blower 11. The mixing chamber 12 also has a gas intake valve 30. The interior of the mixing chamber 12 contains several baffles 31 that delineate an indirect path through the chamber 12 between the gas and air intakes openings 30 and 35 and the conduits 9. The gas and air mix as they travel around the baffles until the gas-air mixture leaves the mixing chamber through the mixing chamber exits 32.

Referring back to FIG. 2, condensation can be produced during the heating process of pressure cooking. This condensation is removed through a condensate drain line 20 to be stored in a condensate tank 13. A drain attachment 34 is connected to the cold zone 29 of the vat 1. When it is open, the drain attachment 34 allows liquid to flow from the vat 1 into a filter tank 14.

Figure 6A:
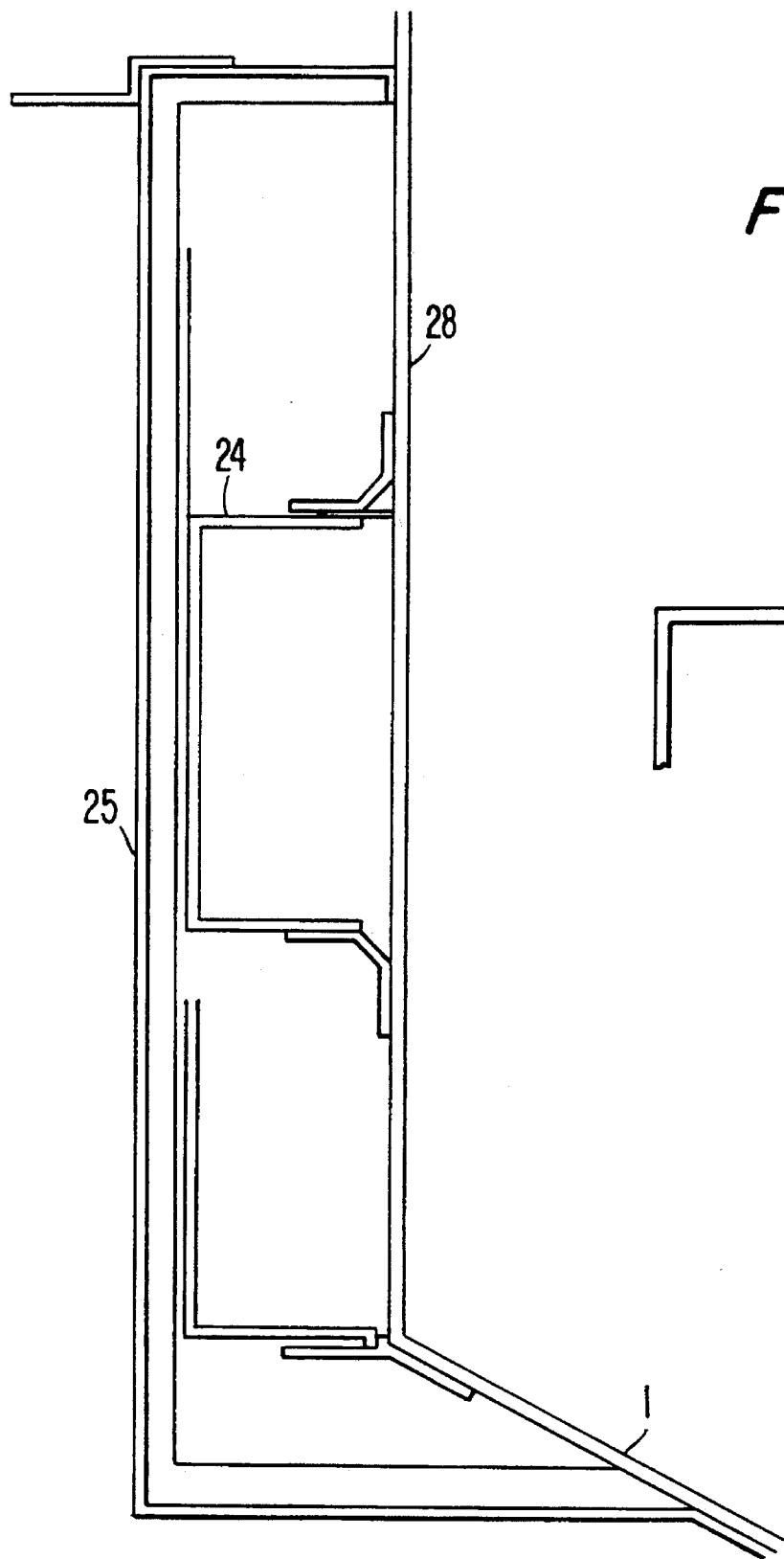
FIG. 6 is a frontal view of half of the insulation box in cross-section and an expanded view of the seal components.
Figure 6B:
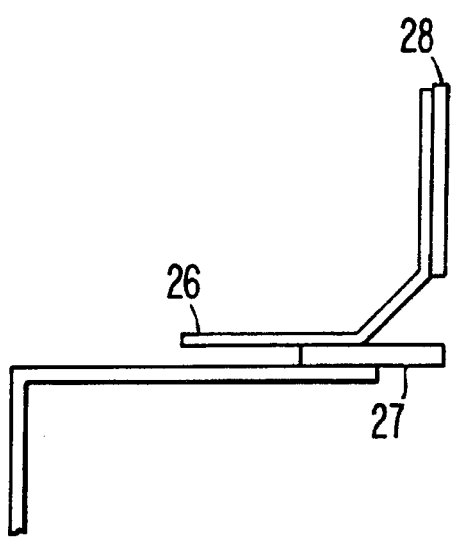

The vat 1, in a preferred embodiment and as illustrated in FIG. 6, is surrounded by an insulation box 25. The insulation box contains insulation, air channels, and a combustion channel 24. The gases inside channel 24 are in thermal contact with the exterior wall of the vat 1. The channel extends from the ends of the heat exchanger tubes 2 at the front of vat 1, around the sides of the vat 1 to the exhaust flue conduit 33 at the rear of the insulation box 25. Other arrangements of gas flow are possible and contemplated by the present invention. The edges of the channel 24 are secured to the vat 1 with a stud component 26. The stud component 26 is attached to a stud on the vat 28 and to a seal 27.

FIGS. 1, 2, 3, 6 and 7 together illustrate the path of combustion product flow. The gas fired heating system is powered by gas and air that are injected into the mixing chamber 12. A high pressure fuel-air mixture enters the conduits 9 through the mixing chamber exits 32. The burner nozzles 10 cause combustion of the high pressure mixture and it flows in the heat exchanger tubes 2 within the vat 1. This combustion releases energy and heated combustion products which heat the liquid through the entire surface area of the tubes 2. The combustion products reach the end of the tubes 2 and then enter a combustion channel 24. The combustion channel 24 extends along the sides of the vat 1 within the insulation box 25 to the rear of the vat 1 and, connects to an exhaust flue conduit 33.

Thus, the liquid in vat 1 is heated by the combustion occurring in the heat exchanger tubes 2 immersed in that liquid and the resulting hot gases pass along the outside wall of the vat 1, via combustion channels 24, before being exhausted via the exhaust flue conduit 33. This heating technique provides more uniform and more easily controlled temperatures in the cooking liquid.

Figure 8:
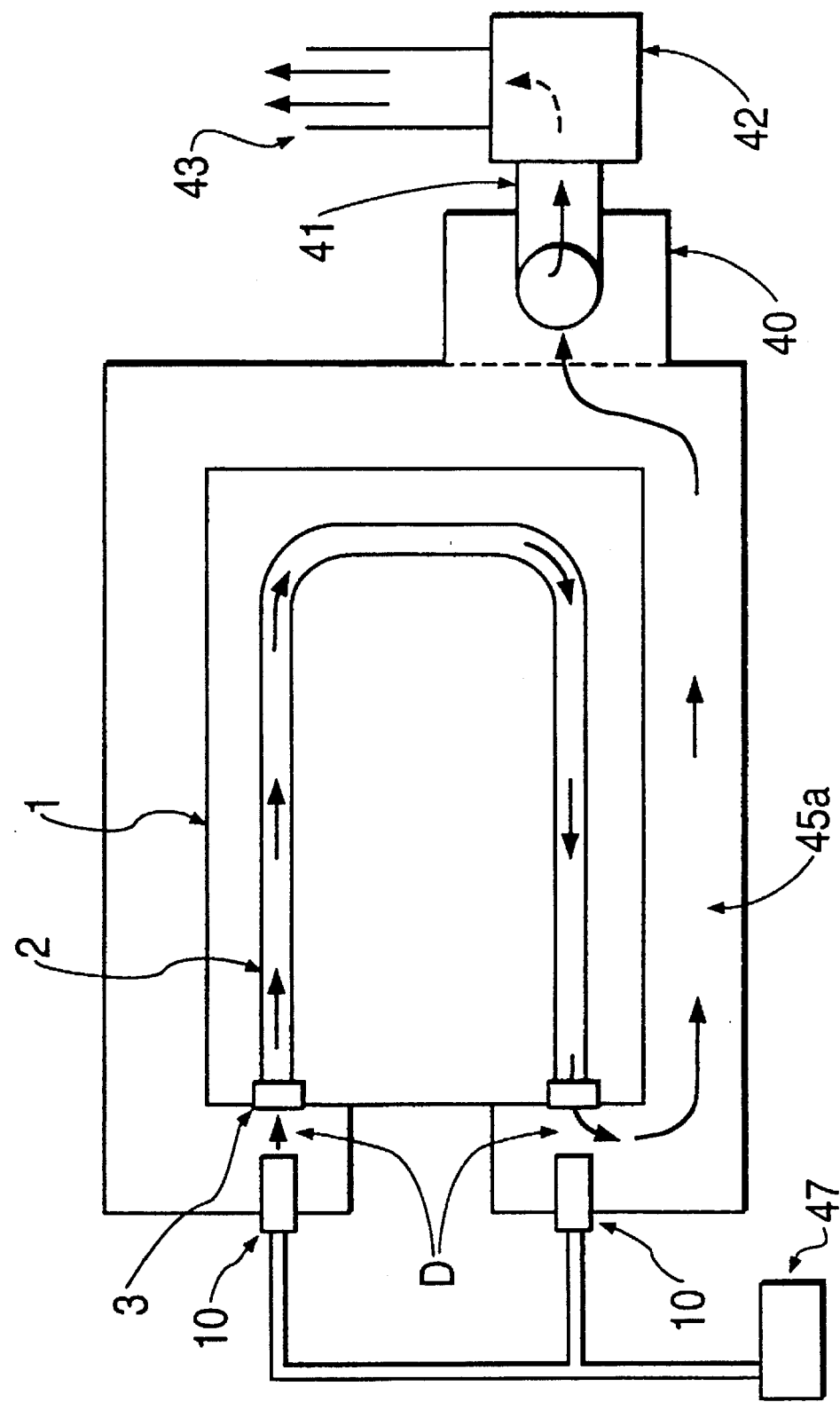
FIG. 8 is a top view of a second embodiment of a cooking apparatus according to the present invention.

Another embodiment of a cooking apparatus is shown in FIGS. 8 and 9. FIG. 8 depicts a top view of an "induced draft" cooking apparatus. In FIG. 8, like numerals are used to depict elements shown in FIGS. 1–7. The apparatus shown in FIGS. 8 and 9 provides uniform heating to the cooking medium contained in the vat 1 by way of heat exchange through heat exchange tubes 2 similar to that explained with respect to FIG. 1–7. Among other things, the cooking apparatus depicted in FIGS. 8 and 9 differs from the embodiment shown in FIG. 1–7 in the manner in which the heat is caused to flow through the heat exchanger tubes. Additionally, an atmospheric burner may be used. An atmospheric burner is a burner which utilizes air from the atmosphere to provide more complete combustion.

In FIG. 8, draft inducer 42 (such as for example a blower or fan) is provided between flue 43 and duct 41 to induce a draft to draw the heat produced at burners 10 through the cooking apparatus. In operation, burners 10 are spaced a predetermined distance D from the ends of tubes 2 as can be seen from FIG. 8. The distance D affects the amount of air that is drawn into tubes 2 and is selected to provide flame stability to help ensure that the burners produce a stable heat source. The distance D is determined or adjusted according to the particular application based on inter alia, the BTU/HR input to the burners and the volume of the draft desired. Improper spacing of the burner from the tube may have adverse results. For example, if the burner is too close to the mouth of tube (i.e. D is too small), the suction from the draft induced by the draft inducer 42 may cause the flame to be erratic or even to "lift-off" the burner. Also, partial blockage of the tube mouth could cause improper suction of draft into the tube resulting in restriction of the draft. If the burner is too far from the mouth of the tube (i.e. D is too large), it becomes difficult to establish the draft necessary to draw the flame into the tubes.

In one example of this embodiment the device has four tubes and four burners. The tubes are approximately oval shaped measuring approximatly 1¹¹⁄₁₆ inches along the major axis and 1⅛ inches along the minor axis. Each of the four burners operates with a fuel input of between 25,000–30,000 BTU/hr. In order to provide proper heat transfer to the cooking medium, the desired draft volume is 50–65 CFM per tube. The proper spacing, D, of the burners from the tube ends in this embodiment is about 2.25 inches.

The system of FIGS. 8 and 9 simplifies the apparatus and improves the working environment in the vicinity of the cooking apparatus. If the burners used are atmospheric burners, the system is self-regulating, i.e., no pressure regulated mixing chamber is required to control the fuel-air mix and cause the burner nozzle to inject the combustion products into the heat exchanger tubes. These burners are spaced a distance D from the ends of the heat exchanger tubes and are fed from a fuel supply 47 (shown in FIG. 8). A draft is induced through the heat exchanger tubes 2 by draft inducer 42 to draw combustion products through the tubes. The air that is sucked into the tubes by the draft inducer 42 advantageously provides secondary combustion air for the atmospheric burner flame to enable more complete combustion of the fuel. Moreover, using a draft to draw the combustion products through the tubes, instead of "firing" the products into the tubes, significantly reduces noise due to "combustion roar" thereby providing a more pleasant working environment.

The path of the induced draft for the upper heat exchangers is illustrated by way of the arrows in FIGS. 8 and 9. A mixture of heated combustion products and air, heated as a result of the energy released by combustion at the burners 10, is drawn into the upper heat exchanger tubes 2, through the upper combustion channel 45a, to exhaust flue conduit 40, duct 41, and draft inducer 42 and is expelled out flue 43.

Figure 9A:
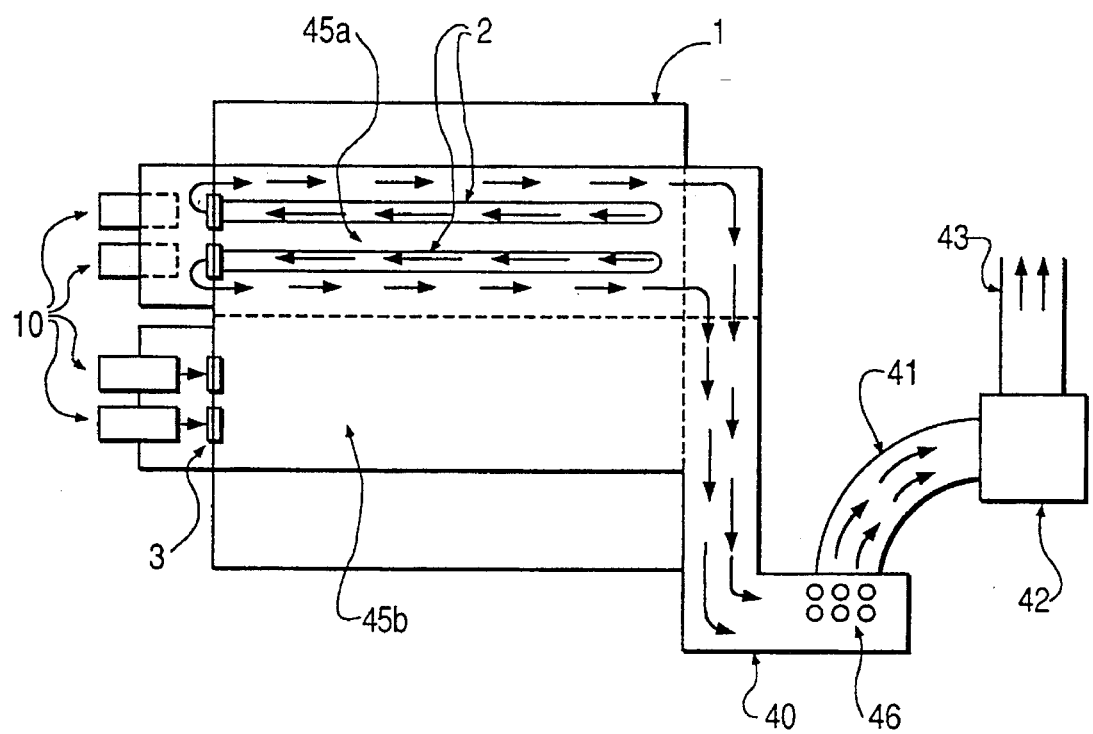
FIGS. 9A and 9B are side views of a second embodiment of a cooking apparatus according to the present invention.
Figure 9B:
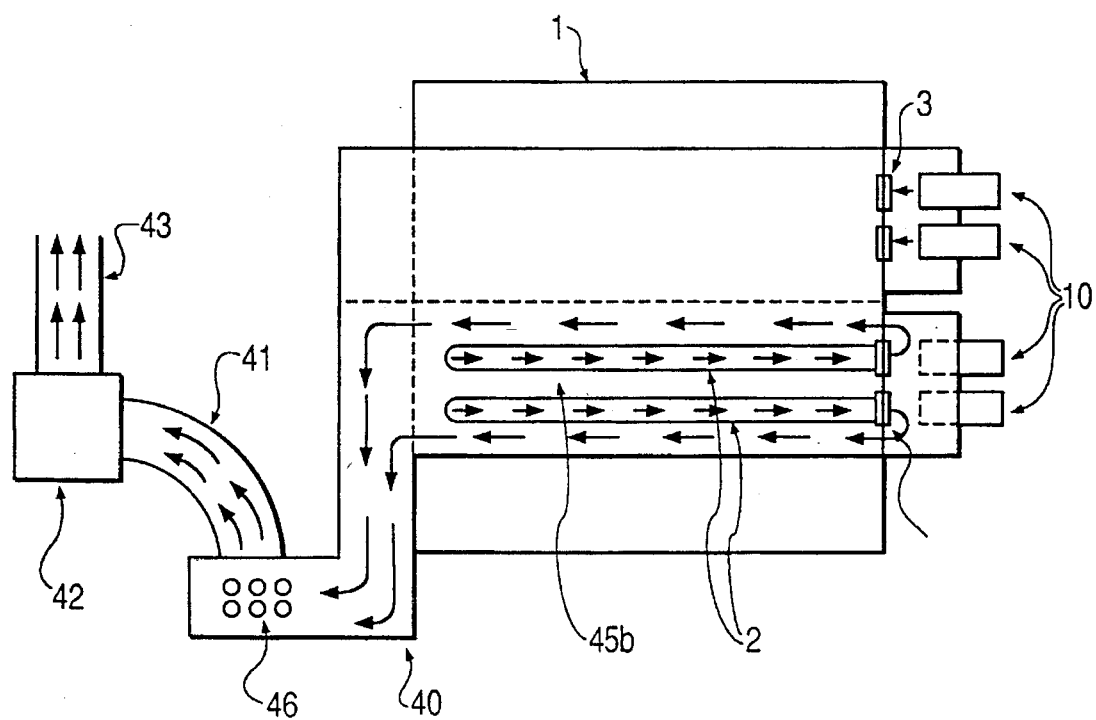

FIGS. 9A and 9B depict side views of the "induced draft" cooking apparatus. In the embodiment shown, four heat exchanger tubes 2 are used. Two are associated with the upper burners and two are associated with the lower burners. FIG. 9A shows the flow path of the induced draft in the upper burners. The draft induced in the upper burners and the draft induced in the lower burners start at the respective upper and lower burners 10, pass separately through tubes 2 in opposite directions, exit tubes 2 on opposite sides of the cooking apparatus, are drawn through channels 45a and 45b, respectively, and come together at the common flue conduit 40 disposed generally at the back of the cooking apparatus.

Exhaust dilution holes 46 may be disposed in flue conduit 40 (FIG. 9). Dilution holes 46 provide temperature regulation to the draft inducer 42. The heated combustion products produced at the burners 10 impart much of their heat to the fluid cooking medium through the heat exchanger tubes 2 and combustion channels 45a and 45b. Nevertheless, the temperature of the combustion products remains quite high when they arrive at the flue conduit 40 and draft inducer 42. If the combustion products were allowed to remain at such an elevated temperature, they could cause severe heat stress and damage the draft inducer 42. The exhaust dilution holes 46 allow air at ambient temperature to join the draft of combustion products and thereby cool the draft to a temperature which will not damage the draft inducer 42. The number, location and size of these holes is generally fixed so as to provide proper temperature regulation to the draft inducer. Alternatively, the number of holes open to the air and/or their aperture could be variable and thermostatically controlled.

While an atmospheric burner is preferred for this embodiment, other types of burners or heat generators may be used in certain circumstances.

Many other variations and modifications may be made in the apparatus and techniques hereinbefore described, by those having experience in this technology, without departing from the concepts of the present invention. Accordingly, it should be clearly understood that the apparatus depicted in the accompanying drawings and referenced in the foregoing description are illustrative only and are not intended as limitations on the scope of the invention. The scope of the invention is to be limited only by the following claims.

What is claimed is:

1. A cooking apparatus comprising:
    a vat for holding a cooking medium;
    one or more heat exchange tubes located substantially within said vat;
    means for generating heat; and,
    means for inducing a draft to cause heat generated by the means for generating heat to be drawn through said one or more heat exchange tubes.

2. The cooking apparatus of claim 1 further comprising one or more substantially enclosed pathways, each pathway in communication with an exit portion of the one or more heat exchange tubes and the means for inducing a draft.

3. The cooking apparatus of claim 1 further comprising means for regulating temperature of the induced draft by introducing atmospheric air into the draft.

4. The cooking apparatus of claim 1 further comprising a number of exhaust dilution holes arranged to allow atmospheric air to mix with the induced draft;
    whereby the atmospheric air mixes with the induced draft and thereby lowers the temperature of the induced draft.

5. The cooking apparatus of claim 1 wherein the one or more heat exchange tubes are "U"-shaped heat exchange tubes.

6. The cooking apparatus of claim 1 wherein the one or more heat exchange tubes are "U"-shaped heat exchange tubes disposed horizontally within said vat.

7. The cooking apparatus of claim 6 wherein each end of each "U"-shaped heat exchange tube is adapted to cover the interior side of an aperture in a wall of said vat.

8. The cooking apparatus of claim 1 wherein said one or more heat exchange tubes comprises four "U"-shaped heat exchange tubes disposed substantially parallel to each other within said vat.

9. The cooking apparatus of claim 1 wherein said means for generating heat comprises one or more burners.

10. The cooking apparatus of claim 9 wherein each of said one or more burner is arranged adjacent one end of each heat exchange tube.

11. The cooking apparatus of claim 10 wherein each of said burners is spaced a predetermined distance from the exterior wall of said vat.

12. The cooking apparatus of claim 1 wherein said means for generating heat comprises one or more atmospheric burners.

13. The cooking apparatus of claim 1 wherein the means for inducing a draft comprises a blower.

14. A cooking apparatus comprising:
    a vat for holding a cooking medium;
    at least one "U"-shaped heat exchange tube, each tube located within said vat and each said "U"-shaped heat exchange tube having a bulkhead fitting welded to its end;
    at least one burner spaced from an end of each said "U"-shaped heat exchange tube; and
    means for drawing heat from said at least one burner through said at least one "U"-shaped heat exchange tube;
    each said "U"-shaped heat exchange tube being disposed horizontally in said vat and each said "U"-shaped heat exchange tube being attached at each of its ends to cover the interior sides of a first and a second aperture in a wall of said vat.

15. A cooking apparatus comprising;
    a vat for holding a cooking medium;
    at least one upper "U"-shaped heat exchange tube located within said vat;
    at least one lower "U"-shaped heat exchange tube located within said vat;
    at least one burner arranged adjacent a first end of each said "U"-shaped heat exchange tube, each said burner being located at alternating ends of said at least one upper and said at least one lower "U"-shaped heat exchange tubes;
    an insulation box enclosing at least a portion of said vat;
    at least one combustion channel at least partially disposed within said insulation box, extending from a second end of each said "U"-shaped heat exchange tube and terminating at an exhaust flue, and formed so that an exhaust gas located within said at least one combustion channel contacts said vat.

* * * * *